Patented May 10, 1927.

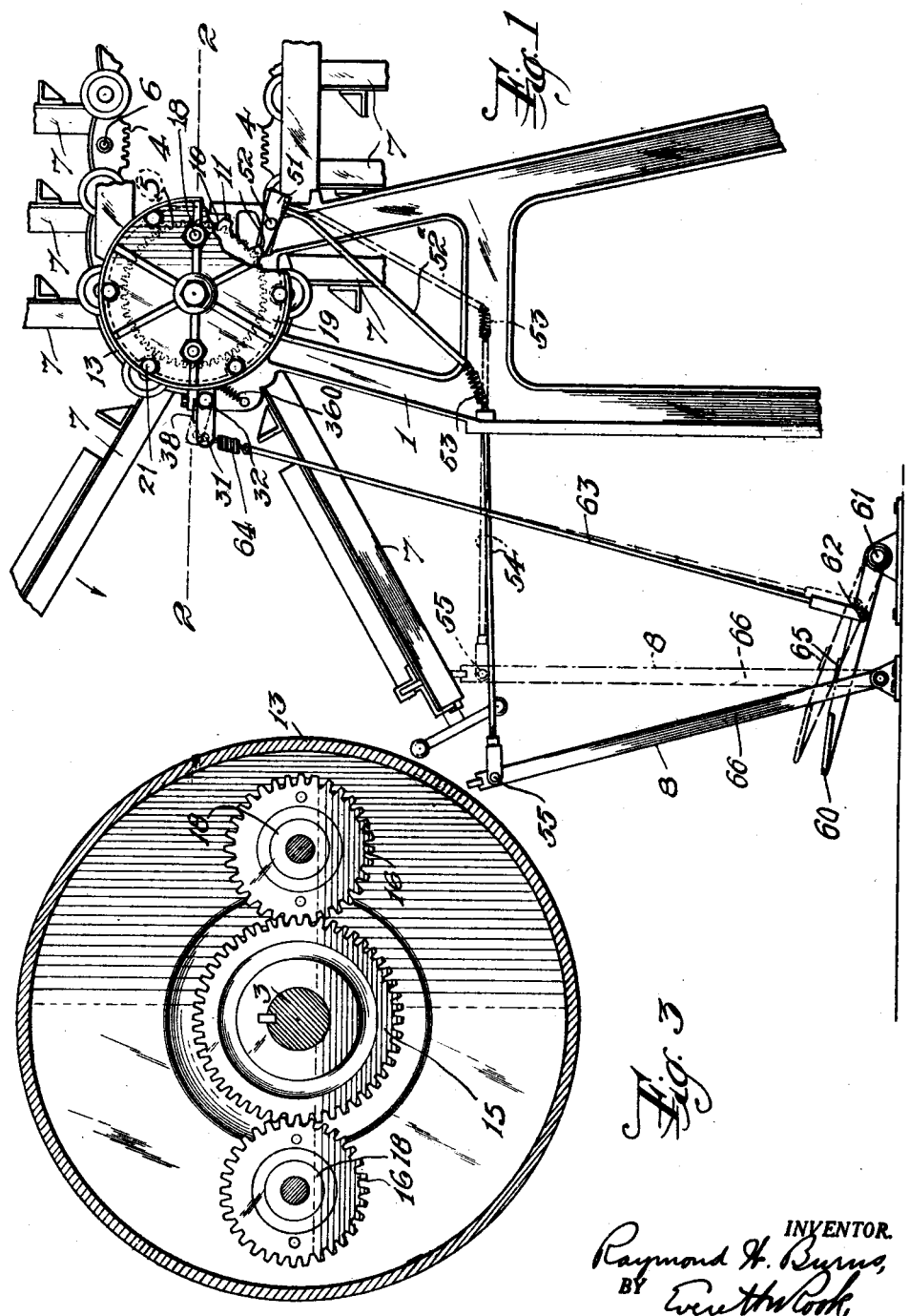

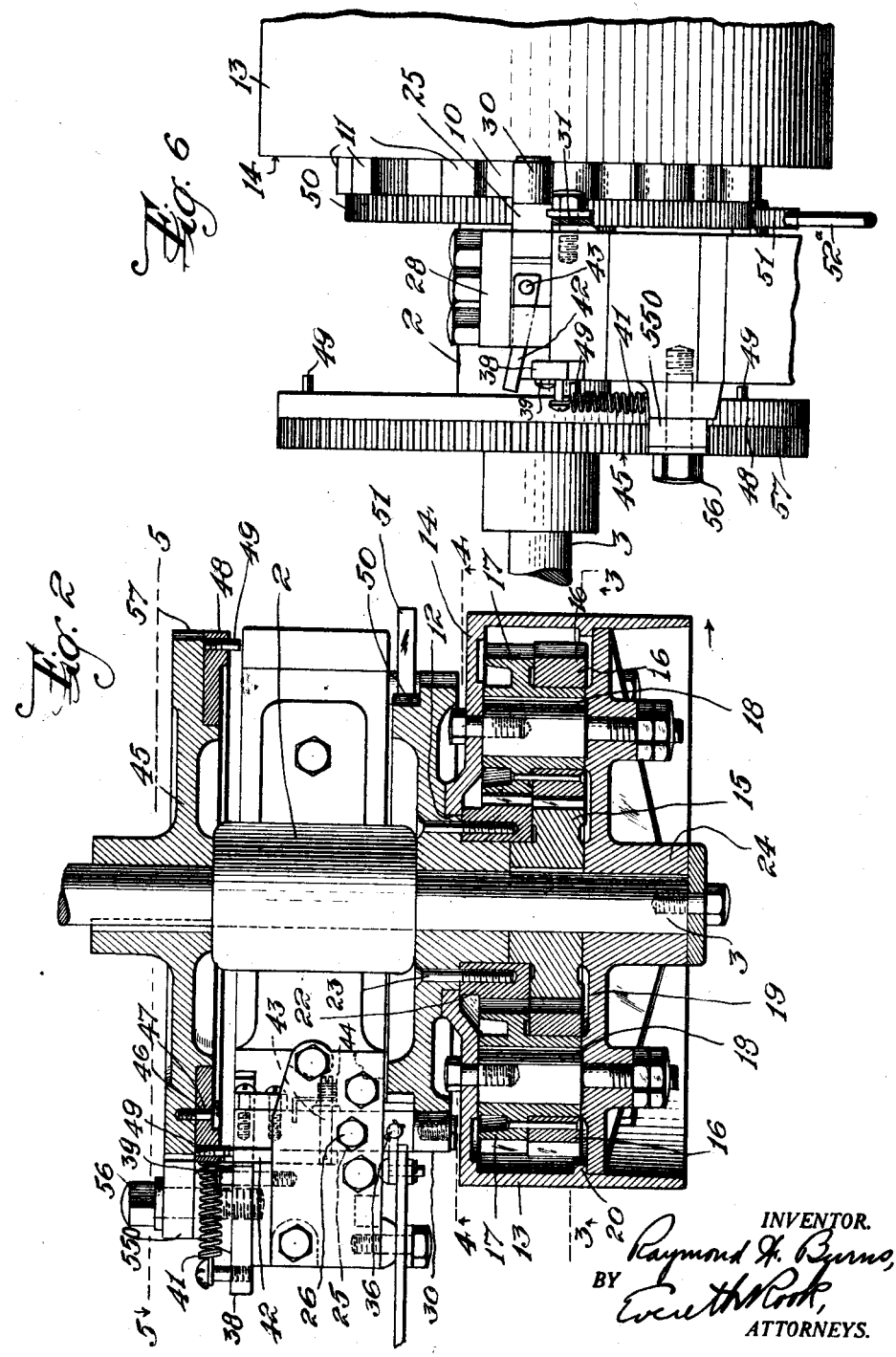

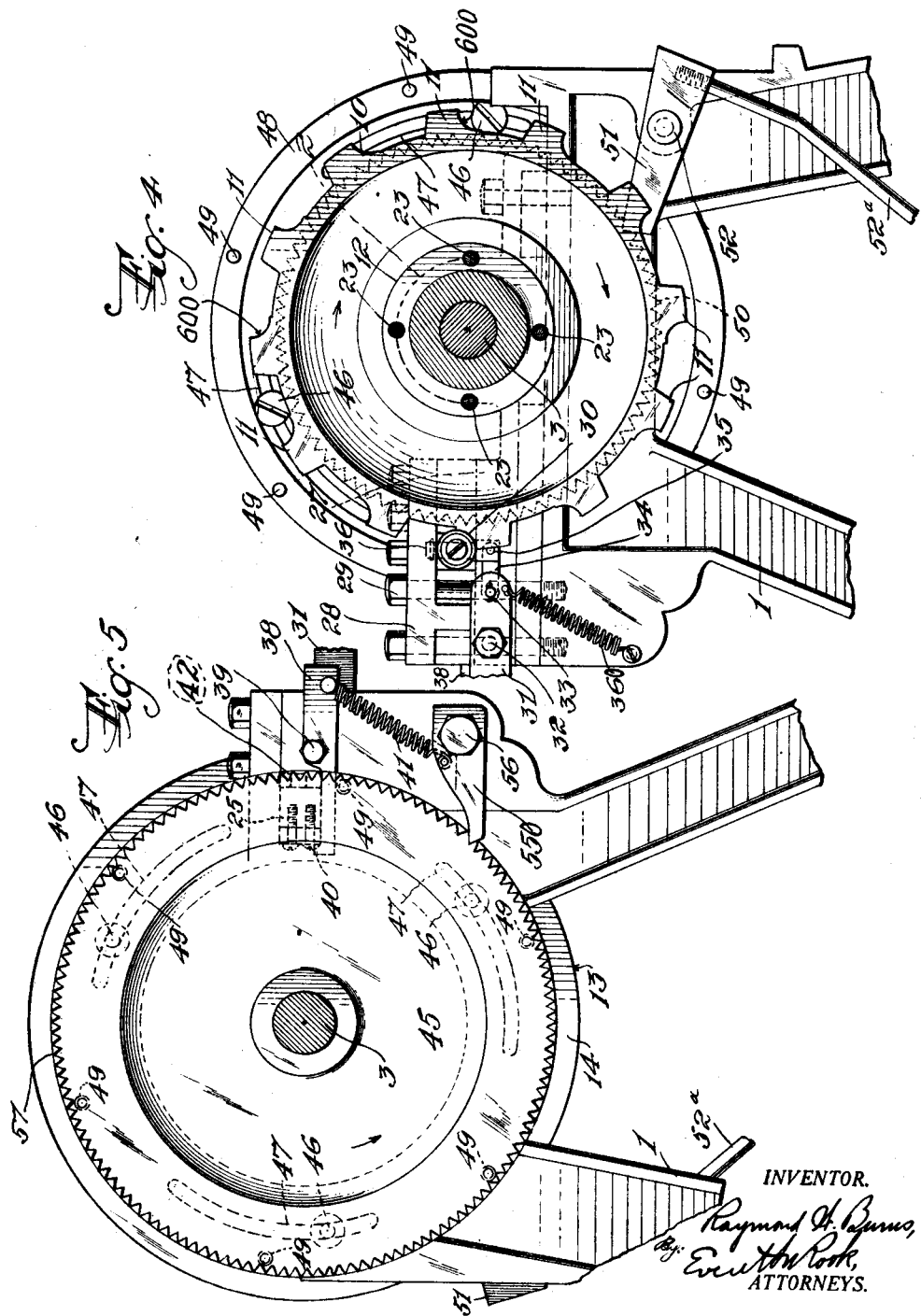

1,628,112

UNITED STATES PATENT OFFICE.

RAYMOND W. BURNS, OF POUGHKEEPSIE, NEW YORK.

CLAMP MACHINE.

Application filed July 15, 1925. Serial No. 43,790.

This invention relates to clamping machines particularly designed for clamping strips or pieces of work to be glued together, the machine comprising a plurality of clamps which are movable to present them successively at a point most convenient for removing the work clamped therein and replacing it with freshly glued work; and more particularly, the invention relates to a power drive mechanism for moving the clamps to and from said position.

One object of the invention is to provide in a machine of the character described, power drive mechanism embodying novel and improved features of construction whereby the clamps are successively moved under power step by step to and from the loading and unloading position, the movement of the clamps being under control of the operator.

Another object is to provide a power drive mechanism for clamp machines of this character which is compact in construction and occupies a minimum amount of space, at the same time being in an out-of-the-way position.

A further object is to provide such a power drive mechanism including a constantly moving driving member and a member adapted to be intermittently driven so as to move the clamps in a step by step manner, with novel and improved means for connecting said driving member to the driven member to produce intermittent movement of the driven member.

Other objects are to provide a power drive mechanism of this character which includes a constantly moving driving member such as a belt pulley and a member to be driven operatively connected to the clamps for moving the latter, with a planetary system of gearing between said driving member and the member to be driven, and manually controlled means cooperating with said planetary gearing for causing intermittent movement of the clamps; to provide such power drive apparatus including a member normally movable by and with said driving member and operatively connected to said planetary gearing, and manually operated means for stopping rotation of said member so as to cause movement of said clamps; to provide automatic means cooperating with said manually operated means for causing a movement of said clamps of predetermined extent; to provide such a machine which is comparatively simple and inexpensive in construction and which is quick, reliable and accurate in operation, and to obtain other results and advantages as may be brought out by the following description.

Referring to the accompanying drawings in which the same characters of reference designate corresponding and like parts throughout the several views, Figure 1 is a fragmentary side elevation of one end of a clamp machine showing a power drive apparatus embodying my invention, portions being broken away for clearness in illustration;

Figure 2 is an enlarged horizontal sectional view, taken on the line 2—2 of Figure 1, the clamps being omitted;

Figure 3 is an enlarged vertical sectional view, taken on the line 3—3 of Figure 2;

Figure 4 is a vertical sectional view, taken on the line 4—4 of Figure 2;

Figure 5 is a vertical sectional view, taken on the line 5—5 of Figure 2, and

Figure 6 is an end elevation of the machine support shown in Figure 4.

For the purpose of explaining the principles of the invention, I have shown it in connection with a known clamping machine which includes a pair of supporting standards 1 having bearings 2 and a shaft 3 at each end of the machine, the standards of each pair being spaced and providing a passageway between themselves for endless carrier chains 4 which pass around the shafts 3 provided in the standards at the front and rear ends of the machine, wheels or drums 5 being mounted on the shafts for supporting said chains, and preferably from the middle of each link of one chain to the middle of the opposite end of the other chain extends a cross-rod 6, see Figure 1, all of said rods remaining parallel as they are carried along by the chains.

Upon these rods of the successive links are mounted a series of clamps 7, there being any desired number of clamps upon each rod transversely of the machine.

One of the shafts 3 is power driven for moving the chains longitudinally of the machine to successively bring the clamps 7 into a convenient loading and unloading position where they are temporarily supported during the loading and unloading operation by a work support 8 pivotally mounted in any suitable manner as upon the floor to swing into and out of position beneath the clamps. In Figure 1 the support 8 is shown as swung out of supporting relation to the clamps to permit the latter to move downwardly and rearwardly away from the loading and unloading position. The clamps are so arranged on the chains 4 as to be disposed at angles of about 60° when they are passing over the drums or wheels 5, as shown in Figure 1, and each movement of the chains 4 is of a distance sufficient to carry the clamps through this 60° angle.

The present invention relates particularly to a power drive mechanism for the shaft 3. This mechanism includes a stop wheel 10 having preferably a plurality of spaced circumferentially disposed stop lugs 11 thereon preferably although not necessarily arranged at angles to each other equal to one-half the angular relation of the clamps 7 on the drums 5, that is about 30°. This stop wheel is loosely revoluble upon one end of one of the shafts 3 at the outer side of the corresponding support 1, and has at its outer side a hub 12 upon which is loosely revoluble a pulley 13 which is preferably hollow and formed at one end with a web 14 which has an opening to fit the hub 12. Within the pulley 13 and keyed to the shaft 3 is a gear 15 which meshes at substantially diametrically opposite points with two pinions 16 keyed to pinions 17 journaled upon stub shafts 18 mounted in a cover 19 which closes the open end of the pulley 13 and is an oil tight fit against an interior annular rib 20, being bolted to annularly spaced bosses formed on said rib. The stub shafts 18 may be in the form of bolts and thus serve to assist in securing the cover 19 to the pulley, and preferably other bolts 21 pass through the cover and the web 14 of the pulley for more securely fastening the cover to the pulley. The pinions 17 mesh with a gear 22 at substantially diametrically opposite points, and said gear is fixedly connected to the stop wheel 10 by any suitable means such as the screws 23. Preferably, the cover 19 is formed with a bearing boss 24 which in connection with the hub 12 on the stop wheel 10 serves to balance the pulley upon the shaft 3. The pulley is driven in the direction of the arrow on Figure 1 from any suitable source of power by means of a belt, not shown. The gear 15 has a greater number of teeth than the gear 22, while the pinions 16 have a greater number of teeth than the pinions 17.

It will be obvious, therefore, that while the shaft 3 is stationary and the stop wheel 10 free to rotate, said stop wheel will be driven in the direction of the arrows in Figure 4 at a slower speed than that of the pulley 13. Should the stop wheel 10 be held against rotation, the shaft 3 would be rotated in the direction opposite to that of the pulley 13, and accordingly the clamps 7 moved in the direction opposite to that of the pulley 13.

Accordingly, means is provided for manual operation to stop rotation of the stop wheel 10 when it is desired to cause movement of the clamps to or from the loading and unloading position. This means is shown as including a lever 25 pivotally mounted intermediate its ends on a bolt 26 between an extension 27 of one of the bearings 2 and a cap plate 28 secured in spaced relation to said extension by means of cap screws 29. One end of said lever 25 has secured thereto a roller 30 which is adapted to engage the stop lugs 11 on the wheel 10 when the lever 25 is swung in the direction to move said roller against the wheel 10. A lever 31 is pivoted intermediate its ends at 32 on the support 1 and has pivoted to its other end at 33 one end of a link 34 the other end of which is pivotally connected at 35 to a pivot stud 36 carried by the lever 25. This lever is preferably actuated by a foot lever 60 pivoted at one end 61 to any suitable support as the floor. The foot lever 60 is pivotally connected intermediate its ends at 62 to one end of a link 63 the other end of which is connected to a tension spring 64 which is also connected to the end of the lever 33 opposite the link 34. The levers 33 and 25 are normally influenced by a spring 360 into a position where the roller 30 is out of the path of movement of the stop lugs 11. Obviously by pressing downwardly on the foot lever 60, the stop lever 25 will be swung to move the roller 30 into the path of the stop lugs 11 so as to stop rotation of the stop wheel 10, and the spring 64 provides a yielding engagement of the roller with the stop wheel.

To prevent operation of the foot lever and consequent movement of the clamps until the clamp support 8 is entirely removed from beneath the clamp, the foot lever 60 may be provided with a lateral arm 65 to engage an upright 66 on the clamp support 8, see dotted lines in Figure 1, so that the foot lever cannot be moved downwardly a sufficient distance to throw the roller 30 against the stop wheel until the clamp support 8 has been moved entirely clear of the clamp above it, as shown in solid lines in Figure 1.

For temporarily holding the roller 30 in operative engagement with the stop wheel 10 to permit the desired movement of the clamps 7 without the necessity for holding down the lever 60. I may provide a detent lever 38 pivotally mounted intermediate its ends as at 39 on the side of the support 1 opposite the hand lever 31, said detent lever having a shoulder 40 adapted to engage behind the end of the lever 25 opposite the roller 30, as clearly shown in Figures 2 and 5 of the drawings. The detent lever 38 is normally influenced into the position to so engage the lever 25 by means of a tension spring 41.

It is necessary to release the lever 25 after each clamp has been moved into the loading and unloading position to stop further movements of the clamps while the same are being loaded and unloaded. For this purpose, I have shown a release lever 42 pivotally mounted by means of a pin 43 on the lever 25 with its free end adapted to overlie the end of the detent lever 38 in engagement with the lever 25, as shown in Figures 2 and 6. This release lever is normally held in a position above and clear of the detent lever 38 by means of a torsion spring 44. An index wheel 45 is keyed on the shaft 3 at the side of the support opposite the stop wheel 10 and has adjustably and concentrically mounted thereon by means of cap screws 46 and arcuate slots 47, a trip ring 48 which has trip pins 49 projecting from its face and circumferentially arranged in spaced angular relation corresponding to the angular relation of the clamps 7 to the shaft 3. Each of these pins 49 is adapted to engage the free end of the release lever 42. In operation, as each clamp 7 moves into the loading and unloading position, one of the trip pins 49 forces the release lever 42 into engagement with the detent lever 38 so as to disengage said detent lever from the stop lever 25, whereupon the said stop lever is swung by the upward movement of the stop lug with which it has been engaged, assisted by spring 360 which holds roller 30 normally out of engagement with stop wheel 10. In other words, stop lugs act as cams against roller 30 unless prevented from relative motion through the intervention of lever 38. When lever 25 moves roller 30 out of engagement with stop wheel 10 it carries with it release lever 42 the end of which escapes horizontally backward from under pin 49. Then the torsion spring 44 immediately elevates the end of release lever 42 to its normal position which is such that the underside of the end of release lever 42 is above the top of pin 49, whereupon the mechanism is in position for the next operation when the next movement of the clamps is desired. When it is desired to adjust the relation of the trip pins 49 to the clamps 7 so as to cause the clamps to stop at the desired position, the cap screws 46 are loosened and the trip plate 48 rotated upon the wheel 45, which movement is permitted by the slots 47.

When the machine is being unloaded of work, there is a time when most of the clamps at the top of the machine are full, while most of the clamps at the bottom of the machine are empty, and there is therefore a tendency for the work and clamps at the top of the machine to rotate the shafts 3 by action of gravity. It is desirable to overcome this gravitational movement in order to prevent unduly rapid rotation of the shafts which might exceed the speed of rotation provided by the power drive. Accordingly, I preferably provide ratchet teeth 50 on the stop wheel 10 to cooperate with a pawl 51 pivotally mounted intermediate its ends as at 52 on the support 1. The pawl has rigidly connected thereto a rod 52 the end of which is connected by a tension spring 53 to one end of a pull rod 54 the other end of which is pivotally connected at 55 to the clamp support 8. When the clamp support is in its normal position beneath a clamp, the pawl 51 is released from the ratchet teeth 50 so that there is no frictional wear of the ratchet teeth and pawl. When the clamp support 8 is swung into its inoperatve position preparatory to movement of the clamps, the pawl is forced through the pull rod 54, spring 53 and rod 52 into tight engagement with the ratchet teeth 50 so as to prevent counter-clockwise rotation (Fig. 4) of the stop wheel should gravitational action on the clamps tend to rotate the shafts 3 at a speed greater than that produced by the power drive.

Similarly, when the machine is being loaded, there is a time when the clamps at the top of the machine are mostly empty while the clamps at the bottom are mostly full, and there is a tendency of the full clamps to move backwardly, that is in opposition to the power drive. To overcome this effect, I pivot a pawl 550 at one end as at 56 upon the side of the support 1 opposite the pawl 51 to cooperate with ratchet teeth 57 formed on the periphery of the wheel 45. The pawl 550 may be maintained in engagement with the teeth 57 by the same spring 41 which influences the detent lever 38 into engagement with the stop lever 25. Obviously, the pawl 550 will always prevent rotation of the shaft 3 in the direction of the arrow on Figure 5, and accordingly prevent backward movement of the clamps 7.

In operation of the machine, the pulley 13 is constantly driven by a belt or other suitable driving connection from a source of power. The stop lever 25 is normally in a position to locate the roller 30 out of engagement with the stop wheel 10, and accordingly the said stop wheel normally rotates with the pulley 13 at a much slower speed in the same direction. One of the clamps is normally resting upon the clamp support 8, as shown in Figure 1, where it is unloaded and reloaded. After loading of the clamp, the support 8 is swung outwardly from beneath the clamp, after which the foot lever 60 is forced downwardly which moves the stop lever 25 to locate the roller 30 in the path of movement of the stop lugs 11 on the stop wheel 10. Rotation of the stop wheel is thus interrupted, whereupon the shaft 3 is rotated in a direction opposite to that of the pulley 13 to move the clamps in the direction of the arrow on Figure 1. The roller 30 is held in engagement with the stop wheel 10 by the detent lever 39, and the clamps continue to move until one of the trip pins 49 forces the release lever 42 into engagement with the detent lever 39 so as to disengage said detent lever to release the stop lever 25. Upon its release, the stop lever is swung into inoperative position by the spring 360 so that the roller 30 is disengaged from the stop wheel 10 which then starts to rotate with the pulley 13 so that the movement of the clamps is stopped. This action is repeated for each movement of the clamps.

Preferably, the stop lugs 11 have a curved surface 600 concentric with the roller 30 to engage the roller, the length of said curved surfaces being less than a quadrant, so that all hook action or tendency of the stop lugs to hang upon the roller 30 is eliminated. Accordingly, the stop wheel 10 is quickly released for rotation with the pulley 13 so that the clamps are accurately stopped at the desired loading and unloading position.

While I have shown and described a certain preferred embodiment of the invention, it will be understood that this is primarily for the purpose of illustrating the principles of the invention and that many modifications and changes can be made in the details of construction without departing from the spirit or scope of the invention. Therefore, I do not desire to be understood as limiting myself except as required by the following claims when construed in the light of the prior art.

Having thus described the invention, what I claim is:

1. A clamp machine comprising a frame, a plurality of clamps, means for mounting said clamps on said frame to successively move to and from a predetermined position including a rotatable shaft, a driving member, an operative connection between said shaft and said driving member including a revoluble element, means for holding and releasing said revoluble element, and means to cause rotation of said shaft when said revoluble element is held against turning and to stop rotation of said shaft when said revoluble element is released.

2. A clamp machine comprising a frame, a plurality of clamps, means for mounting said clamps on said frame to successively move to and from a predetermined position including a rotatable shaft, a constantly movable driving member, an operative connection between said shaft and said driving member including an element movable relatively to said shaft, an element connected to said shaft to move therewith, means for holding and releasing the first mentioned element, and means to cause rotation of said shaft when said first-mentioned element is held against movement and stop rotation of said shaft when said first-mentioned element is released.

3. A clamp machine comprising a frame, a plurality of clamps, means for mounting said clamps on said frame to successively move to and from a predetermined position including a rotatable shaft, a driving member rotatable upon said shaft coaxially therewith, an operative connection between said driving member and said shaft including an element fixed upon said shaft, an element rotatable upon said shaft and a connection between said driving member and both said elements, and means for successively interrupting movement of the second-mentioned element and releasing said element to start and stop rotation of said shaft respectively.

4. A clamp machine comprising a frame, a plurality of clamps, means for mounting said clamps on said frame to successively move to and from a predetermined position including a rotatable shaft, a driving member rotatable upon said shaft coaxially therewith, a gear fixed upon said shaft, a second gear rotatable upon said shaft, a geared connection between said driving member and both said gears, and means for successively interrupting rotation of the second-mentioned gear and releasing it for rotation to start and stop rotation of said shaft respectively.

5. A clamp machine comprising a frame, a plurality of clamps, means for mounting said clamps on said frame to successively move to and from a predetermined position including a rotatable shaft, a driving member rotatable upon said shaft coaxially therewith, a gear fixed upon said shaft, a second gear rotatable upon said shaft, a geared connection between said driving member and both said gears, and means for successively interrupting rotation of the second-mentioned gear and releasing it for rotation, the ratio and arrangement of said gearing being such that when the second-mentioned gear is released it rotates in the same direction as said driving member at a slower speed and when the second-mentioned gear is held against rotation said shaft is rotated in the direction opposite to that of said driving member at a slower speed.

6. A clamp machine comprising a frame, a plurality of clamps, means for mounting said clamps on said frame to successively move to and from a predetermined position including a rotatable shaft, a driving member rotatable upon said shaft coaxially therewith, a gear fixed upon said shaft, a second gear rotatable upon said shaft, a pair of pinions mounted upon said driving member to rotate together one of said gears meshing with each of said pinions, and means for successively interrupting rotation of the second-mentioned gear and releasing it for rotation to start and stop rotation of said shaft respectively.

7. A clamp machine comprising a frame, a plurality of clamps, means for mounting said clamps on said frame to successively move to and from a predetermined position including a rotatable shaft, a driving member, an operative connection between said shaft and said driving member including a revoluble element, an element connected to said shaft to rotate therewith, means for holding and releasing said revoluble element, and means to cause rotation of said shaft element when said revoluble element is held against turning and to stop rotation of said shaft element when said revoluble element is released.

8. A clamp machine comprising a frame, a plurality of clamps, means for mounting said clamps on said frame to successively move to and from a predetermined position including a rotatable shaft, a hollow driving member rotatable upon said shaft, a gear fixed upon said shaft within said driving member, a second gear within said driving member and revoluble upon said shaft, a driving connection within said driving member between said member and each of said gears, and means for holding said second gear against rotation and releasing the same to start and stop rotation of said shaft respectively.

9. A clamp machine comprising a frame, a plurality of clamps, means for mounting said clamps on said frame to successively move to and from a predetermined position including a rotatable shaft, a hollow driving member rotatable upon said shaft, a driving connection between said shaft and said driving member including an element within said driving member movable relatively to said shaft and having a portion projecting from said member, a second element within said driving member connected to said shaft to move therewith, means for releasably engaging said projecting portion of the first-mentioned element to interrupt movement of said element, and connecting means within said driving member between said member and both said elements to cause rotation of said shaft when said first-mentioned element is held against movement and stop rotation of said shaft when said first-mentioned element is released.

10. A clamp machine comprising a frame, a plurality of clamps, means for mounting said clamps on said frame to successively move to and from a predetermined position including a rotatable shaft, a hollow driving member rotatable upon said shaft, a gear fixed upon said shaft within said driving member, a second gear within said driving member and revoluble upon said shaft, a driving connection within said driving member between said member and each of said gears, a stop wheel having circumferentially spaced stop teeth revoluble on said shaft exteriorly of said driving member and fixedly connected to said second gear, and means for releasably engaging said stop teeth to successively stop rotation of said second gear and release it for rotation so as to start and stop rotation of said shaft respectively.

11. A clamp machine comprising a frame, a plurality of clamps, means for mounting said clamps on said frame to successively move to and from a predetermined position including a rotatable shaft, a planetary system of gearing mounted on said shaft and including a driving member to be connected to a source of power and rotatable upon said shaft, and means cooperating with said gearing to successively start and stop rotation of said shaft.

12. A clamp machine comprising a frame, a plurality of clamps, means for mounting said clamps on said frame to successively move to and from a predetermined position including a rotatable shaft, a planetary system of gearing for driving said shaft including a driving member, parts of said gearing being rotatable upon said shaft and other parts fixed upon said shaft, and means cooperating with said rotatable parts for successively stopping rotation thereof and releasing them for rotation to start and stop rotation of said shaft respectively.

13. The machine set forth in claim 1 with the addition of means for predetermining the periods of holding said revoluble element against turning.

14. The machine set forth in claim 2 with the addition of means to cooperate with holding means for permitting rotation of said shaft a predetermined distance.

15. The machine set forth in claim 4 with the addition of means cooperating with the last-mentioned means for permitting rotation of said shaft a predetermined distance.

16. The machine set forth in claim 9 with the addition of means to cooperate with said means for interrupting rotation of said first-mentioned element to permit rotation of said shaft a predetermined distance.

17. A clamp machine comprising a frame, a plurality of clamps, means for mounting said clamps on said frame to successively move to and from a predetermined position including a rotatable shaft, a constantly movable driving member, an operative connection between said shaft and said driving member including an element movable relatively to said shaft, an element connected to said shaft to move therewith, releasable means for temporarily holding the first-mentioned element against rotation, and trip mechanism for automatically releasing said holding means to stop rotation of said shaft at a predetermined point.

18. A clamp machine comprising a frame, a plurality of clamps, means for mounting said clamps on said frame to successively move to and from a predetermined position including a rotatable shaft, a driving member rotatable upon said shaft coaxially therewith, a gear fixed upon said shaft, a second gear rotatable upon said shaft, a geared connection between said driving member and both said gears, releasable means for temporarily holding said second gear against rotation, and trip mechanism for automatically releasing said holding means to stop rotation of said shaft at a predetermined point.

19. A clamp machine comprising a frame, a plurality of clamps, means for mounting said clamps on said frame to successively move to and from a predetermined position including a rotatable shaft, a constantly movable driving member, an operative connection between said shaft and said driving member including an element movable relatively to said shaft, an element connected to said shaft to move therewith, a manually operable lever to releasably engage said first-mentioned element to hold it against rotation, detent means for temporarily holding said lever in such engagement, and trip mechanism for automatically actuating said detent means to release said lever from engagement with said first-mentioned element to stop rotation of said shaft at a predetermined point.

20. A clamp machine comprising a frame, a plurality of clamps, means for mounting said clamps on said frame to successively move to and from a predetermined position including a rotatable shaft, a driving member rotatable upon said shaft coaxially therewith, a gear fixed upon said shaft, a second gear rotatable upon said shaft, a geared connection between said driving member and both said gears, a manually operable lever to releasably engage said second gear to hold it against rotation, detent means for temporarily holding said lever in such engagement, and trip mechanism for automatically actuating said detent means to release said lever from engagement with said second gear to stop rotation of said shaft at a predetermined point.

21. A clamp machine comprising a frame, a plurality of clamps, means for mounting said clamps on said frame to successively move to and from a predetermined position including a rotatable shaft, a hollow driving member rotatable upon said shaft, a gear fixed upon said shaft within said driving member, a second gear within said driving member and revoluble upon said shaft, a driving connection within said driving member between said member and each of said gears, a stop wheel having circumferentially spaced stop teeth revoluble on said shaft exteriorly of said driving member and fixedly connected to said second gear, a manually operable lever to releasably engage said stop teeth to hold said second gear against rotation, detent means for temporarily holding said lever in such engagement, and trip mechanism for automatically actuating said detent means to release said lever from engagement with said second gear to stop rotation of said shaft at a predetermined point.

22. The system set forth in claim 12 with the addition of means cooperating with the last-mentioned means to permit rotation of said shaft a predetermined distance.

23. The machine set forth in claim 1 with the addition of a manually operable lever to releasably hold said revoluble element against turning, detent means for temporarily locking said lever in such holding position and trip means driven by said shaft to actuate said detent means to release said lever so as to stop rotation of said shaft.

24. A clamp machine comprising a frame, a plurality of clamps, means for mounting said clamps on said frame to successively move to and from a predetermined position including a rotatable shaft, a driving member rotatable upon said shaft coaxially therewith, a gear fixed upon said shaft, a second gear rotatable upon said shaft, a geared connection between said driving member and both said gears, a manually operable lever to releasably engage said second gear to hold it against rotation, detent means for temporarily holding said lever in such engagement, and a trip wheel fixed on said shaft and having a plurality of annularly spaced trip pins to actuate said detent means to release said lever so as to stop rotation of said shaft.

25. A clamp machine comprising a frame, a plurality of clamps, means for mounting said clamps on said frame to move to and from a predetermined position, a clamp support for temporarily underlying said clamps in said position, a ratchet on said means for mounting the clamps, and a pawl to cooperate with said ratchet for preventing forward movement of said clamps by action of gravity and movable into engagement with said ratchet upon movement of said clamp support from beneath a clamp.

26. The machine set forth in claim 1 with the addition of a removable support to temporarily underlie said clamps in said position, a ratchet on said shaft, and a pawl on said frame to releasably engage said ratchet to prevent rotation of said shaft by action of gravity and movable into engagement with said ratchet upon movement of said clamp support from beneath a clamp.

27. The machine set forth in claim 2 with the addition of a removable support to temporarily underlie said clamps in said position, a ratchet on said shaft, and a pawl on said frame to releasably engage said ratchet to prevent rotation of said shaft by action of gravity at a speed greater than produced by said driving member and movable into engagement with said ratchet upon movement of said clamp support from beneath a clamp.

28. The machine set forth in claim 4 with the addition of a removable support to temporarily underlie said clamps in said position, a ratchet on said shaft, and a pawl on said frame to releasably engage said ratchet to prevent rotation of said shaft by action of gravity at a speed greater than produced by said driving member and movable into engagement with said ratchet upon movement of said clamp support from beneath a clamp.

29. The machine set forth in claim 9 with the addition of a removable support to temporarily underlie said clamps in said position, a ratchet on said shaft, and a pawl on said frame to releasably engage said ratchet to prevent rotation of said shaft by action of gravity at a speed greater than produced by said driving member and movable into engagement with said ratchet upon movement of said clamp support from beneath a clamp.

30. In a power drive mechanism, for producing intermittent movement, the combination with a shaft to be driven, of a constantly movable driving member, an operative connection between said shaft and said driving member including an element movable relatively to said shaft, an element connected to said shaft to move therewith, means for holding and releasing the first-mentioned element, and means to cause rotation of said shaft when said first-mentioned element is held against movement and stop rotation of said shaft when said first-mentioned element is released.

31. In a power drive mechanism, for producing intermittent movement, the combination with a shaft to be driven, of a driving member rotatable upon said shaft coaxially therewith, a gear fixed upon said shaft, a second gear rotatable upon said shaft, a geared connection between said driving member and both said gears, and means for successively interrupting rotation of the second-mentioned gear and releasing it for rotation to start and stop rotation of said shaft respectively.

32. In a power drive mechanism, for producing intermittent movement, the combination with a shaft to be driven, of a driving member rotatable upon said shaft coaxially therewith, a gear fixed upon said shaft, a second gear rotatable upon said shaft, a geared connection between said driving member and both said gears, and means for successively interrupting rotation of the second-mentioned gear and releasing it for rotation, the ratio and arrangement of said gearing being such that when the second-mentioned gear is released it rotates in the same direction as said driving member at a slower speed and when the second-mentioned gear is held against rotation said shaft is rotated in the direction opposite to that of said driving member at a slower speed.

33. In a power drive mechanism, for producing intermittent movement, the combination with a shaft to be driven, of a hollow driving member rotatable upon said shaft, a gear fixed upon said shaft within said driving member, a second gear within said driving member and revoluble upon said shaft, a driving connection within said driving member between said member and each of said gears, a stop wheel having circumferentially spaced stop teeth revoluble on said shaft exteriorly of said driving member and fixedly connected to said second gear, and means for releasably engaging said stop teeth to successively stop rotation of said second gear and release it for rotation so as to start and stop rotation of said shaft respectively.

34. The machine set forth in claim 28 with the addition of means to cooperate with holding means for permitting rotation of said shaft a predetermined distance.

35. In a power drive mechanism, for producing intermittent movement, the combination with a shaft to be driven, of a constantly movable driving member, an operative connection between said shaft and said driving member including an element movable relatively to said shaft, an element connected to said shaft to move therewith, a manually operable lever to releasably engage said first-mentioned element to hold it against rotation, detent means for temporarily holding said lever in such engagement, and trip mechanism for automatically actuating said detent means to release said lever from engagement with said first-mentioned element to stop rotation of said shaft at a predetermined point.

36. In a power drive mechanism, for producing intermittent movement, the combination with a shaft to be driven, of a hollow driving member rotatable upon said shaft, a gear fixed upon said shaft within said driving member, a second gear within said driving member and revoluble upon said shaft, a driving connection within said driving member between said member and each of said gears, a stop wheel having circumferentially spaced stop teeth revoluble on said shaft exteriorly of said driving member and fixedly connected to said second gear, a manually operable lever to releasably engage said stop teeth to hold said second gear against rotation, detent means for temporarily holding said lever in such engagement, and trip mechanism for automatically actuating said detent means to release said lever from engagement with said second gear to stop rotation of said shaft at a predetermined point.

37. The machine set forth in claim 1 with the addition of a removable support to temporarily underlie said clamps in said position, means operable by movement of said clamp support from beneath a clamp to prevent forward movement of said clamps at a speed greater than produced by said driving member.

38. The machine set forth in claim 7 with the addition of a removable support to temporarily underlie said clamps in said position, means operable by movement of said clamp support from beneath a clamp to prevent forward movement of said clamps at a speed greater than produced by said driving member.

39. A clamp machine comprising a frame, a plurality of clamps, means for mounting said clamps on said frame to move to and from a predetermined position, a clamp support for temporarily underlying said clamps in said position, and pawl and ratchet means operable by movement of said clamp support from beneath a clamp to prevent forward movement of said clamps by action of gravity.

40. The machine set forth in claim 2 with the addition of a removable support to temporarily underlie said clamps in said position, means operable by movement of said clamp support from beneath a clamp to prevent forward movement of said clamps at a speed greater than produced by said driving member.

41. A clamp machine comprising a frame, a plurality of clamps, means for mounting said clamps on said frame to successively move to and from a predetermined position including a rotatable shaft, a driving member, an operative connection between said shaft and said driving member including a revoluble element, a stop wheel having circumferentially spaced stop teeth fixedly connected to said revoluble element, a manually operable lever to releasably engage said stop teeth to hold said revoluble element against rotation, detent means for temporarily holding said lever in such engagement, and trip mechanism for automatically actuating said detent means to release said lever, said stop teeth formed to force said lever away from them when released.

RAYMOND W. BURNS.